United States Patent

[11] 3,608,884

[72] Inventor Marion W. Humphreys
5631 North East 16 Terrace, Fort
Lauderdale, Fla. 33308 Addie Humphreys,
surviving spouse
[21] Appl. No. 804,392
[22] Filed Mar. 5, 1969
[45] Patented Sept. 28, 1971

[54] WORKHOLDER
3 Claims, 7 Drawing Figs.

[52] U.S. Cl. .................................................. 269/82,
33/174, 33/185, 269/55
[51] Int. Cl. ..................................................... B25b 1/22,
B23q 3/18
[50] Field of Search .......................................... 269/55,
74–85; 33/79, 174 TA, 185; 90/13.1; 10/107

[56] References Cited
UNITED STATES PATENTS
2,528,909  11/1950  Plumb ........................ 10/107 UX

*Primary Examiner*—Andrew R. Juhasz
*Assistant Examiner*—Donald D. Evenson
*Attorney*—Watts, Hoffmann, Fisher & Heinke

ABSTRACT: A workholder comprising a work gripping device at one end of a parallel motion arm which is connected at the opposite end to a stationary surface over which the work gripping device is movable while remaining oriented in a predetermined reference plane.

INVENTOR.
MARION W. HUMPHREYS
BY Watts, Hoffmann,
Fisher & Heinke
ATTORNEYS.

INVENTOR.
MARION W. HUMPHREYS
ATTORNEYS

WORKHOLDER

BACKGROUND OF THE INVENTION

In the performance of machining operations such as drilling, tapping, or the like, it is desirable to be able to accurately and rapidly position a workpiece in relationship to the tool. In tapping or drilling a number of holes at various locations in a surface in a machine where the tool spindle cannot be moved transversely of its axis of rotation, it is necessary to turn or reposition the workpiece and align it with the tool after each hole is machined. It is also necessary to hold the workpiece to prevent it from turning under the tool during the machining operation.

Workholders take any number of forms effective as viselike devices or clamps which hold the workpiece during machining, but which must be loosened and retightened between machining operations. For example, if a workpiece is to have a diamond pattern of four holes, between each successive tapping operation the workpiece must be unclamped, repositioned, aligned and reclamped before advancing the tap again. For precision work, the time consumed in aligning and clamping the workpiece after one machining operation will often exceed the actual machining time required for all four holes. Where the operator runs into difficulty is in attempting to clamp the workpiece without introducing any misalignment.

An object of this invention is to provide an improved workholder on the end of an articulated lever or arm capable of permitting movement of the gripping device over a work surface while maintaining the gripping device in the same or essentially the same angular position.

A further object is to provide an improved workholder of the type mentioned which includes a frame substantially housing the articulated arm and protecting it from damage or becoming fouled by metal turnings or the like.

A further object is to provide a workholder as mentioned having a dual purpose clamp for releasably securing it in a fixed position and during movement, to assist in guiding it into alignment with the tool.

Further objects and advantages will be apparent to those skilled in the art to which the invention pertains from the following description of the present preferred embodiment thereof described with reference to the accompanying drawings in which similar reference characters represent corresponding parts of the several views and in which.

Figure 1:
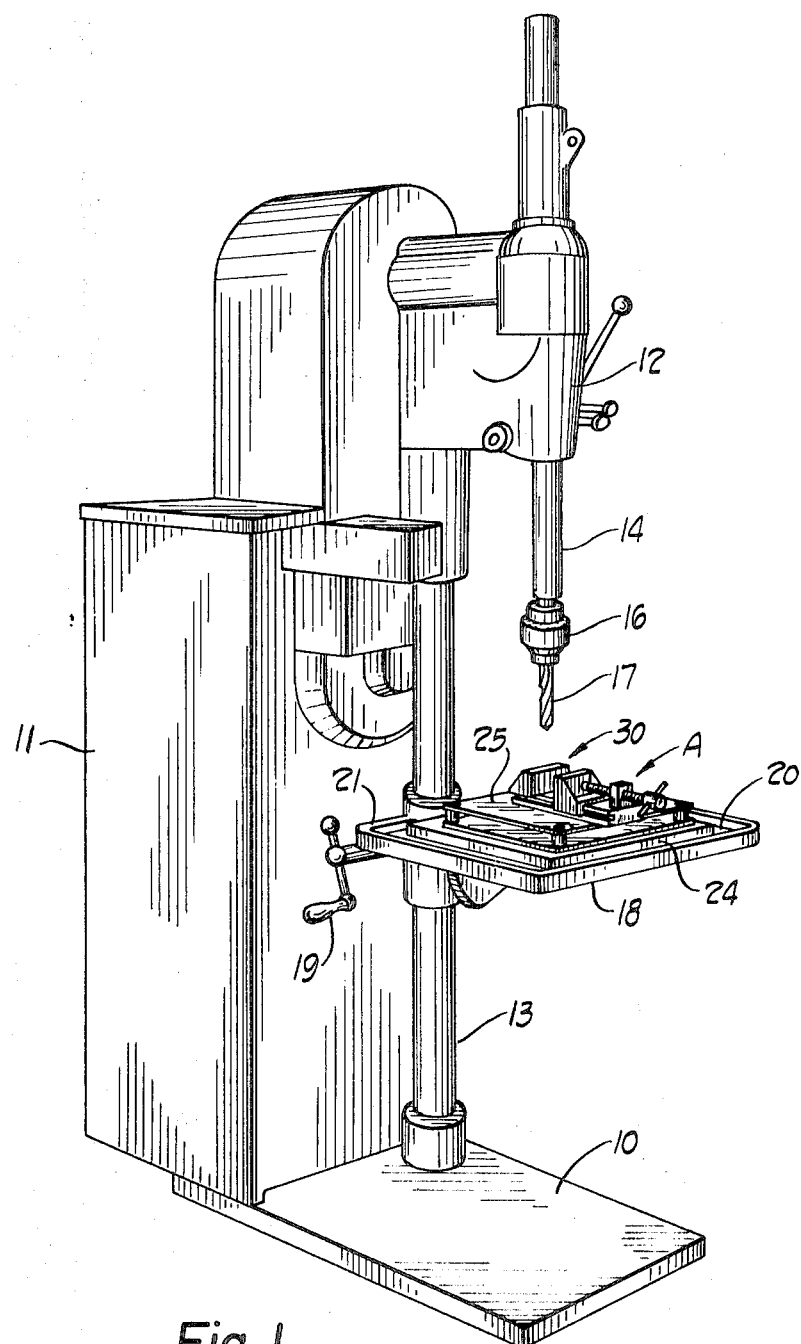
FIG. 1 is a perspective view of a drilling and/or tapping machine having a tool spindle adapted to be vertically reciprocated relative to a worktable upon which rests a workholder constructed in accordance with the invention.
Figure 2:
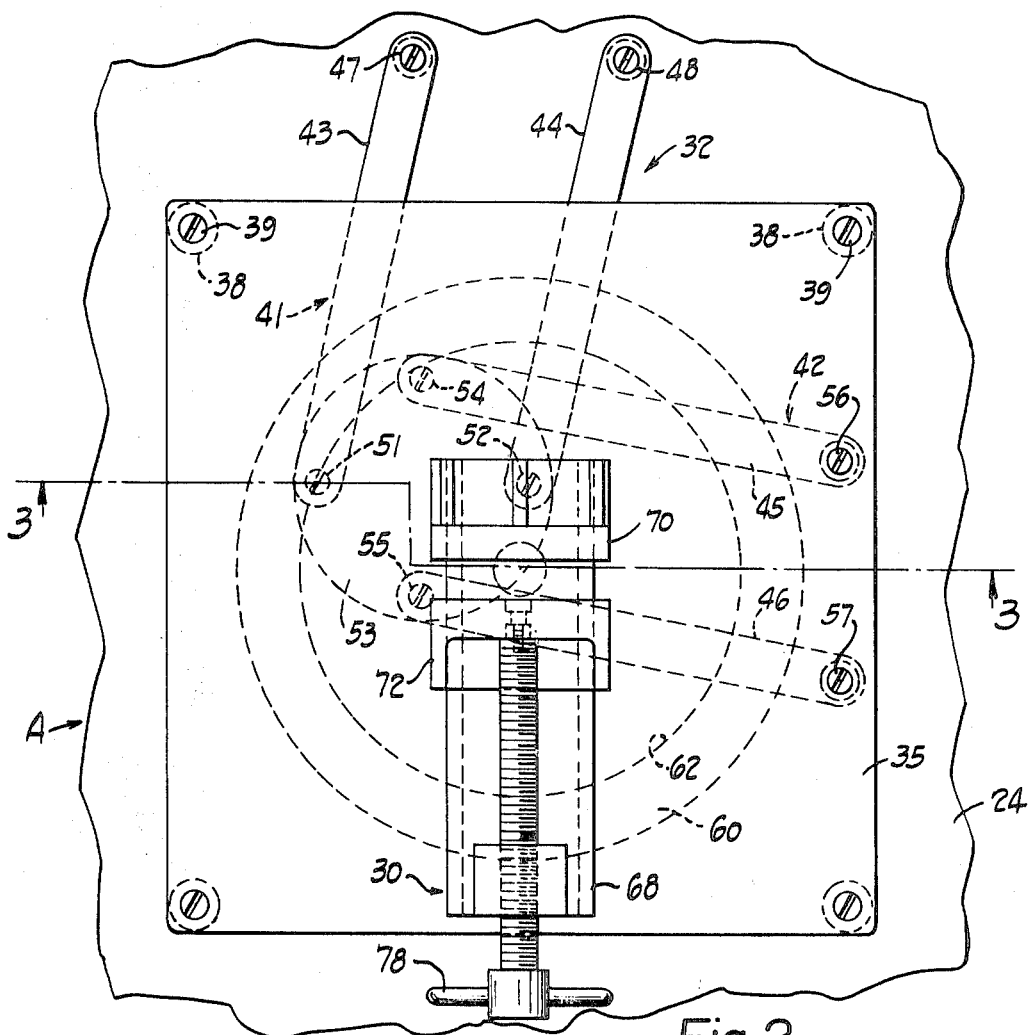
FIG. 2 is a plan view of the workholder shown in FIG. 1.

The invention is illustrated and hereinafter described with particular reference to its use with a drilling machine; however, this is by way of illustration only since the invention is susceptible of being used with other machines and hence reference to a drilling machine is to be understood as being by way of example only and not intended as a limitation.

The machine illustrated in the drawings comprises a base 10 upon which a vertical housing 11 is supported. The upper end of the housing 11 is provided with a forwardly projecting head 12 which is additionally supported from the base 10 by a vertical post or standard 13. The forward end of the head 12 supports a tool spindle 14 for rotation and vertical axial movement by conventional means which are not shown but are contained in the housing 11 and the head 12 and are driven by a reversible electric motor, also supported in the housing 11. The lower end of the tool spindle 14 is provided with the usual chuck 16 for connecting a tool such as a drill 17 for rotation and axial movement with the spindle. Intermediate the base 10 and head 12, the post or standard 13 is provided with a work support table 18 which is clamped to the post 13 at any desired elevation by conventional clamping means actuated by handle 19. The work supporting table 18 may have any desired configuration but is here illustrated as having a rectangular planar area 20 surrounded by a raised flange 21. The table 18 thus constructed is adapted to collect cutting fluid which is then drained by a conduit to a reservoir contained within the base of the housing 11 where the fluid is recirculated to the tool in a manner well known in the art.

In accordance with the invention, the work to be machined is supported by a workholder A shown resting on the table 18. In the preferred embodiment, the workholder A comprises a base 24, a frame 25 slidable on the base 24, a vise 30 carried by the frame 25, and an articulated arm 32 operatively connecting the base 24 and the frame 25. The vise 30 is adjustable to grip a workpiece while it is being machined by the tool 17. The base 24 provides a flat, rectangular upper surface 34 sufficiently large to support the frame 25 in any direction which the operator may choose to move it. The frame 25 comprises a pair of spaced square plates 35, 37, secured together at the corners by spacers 38 and screws 39 providing a rigid frame structure which is slidable upon the surface 34 of the base 24.

One end of the arm 32 is connected to the base 24 and the movable frame 25 and vise 30 are attached to the other end which extends out over the base 24 and between plates 35, 37, the arm 32 comprising a pair of arm sections 41, 42, each formed by a pair of spaced parallel rigid struts 43, 44 and 45, 46, respectively. The upper ends of the struts 43, 44 are pivotally connected by suitable fasteners 47, 48 to upstanding bosses 49, 50, respectively, on the base 24 and the lower ends thereof are pivotally connected by suitable fasteners 51, 52 to a disklike intermediate arm member 53. The left-hand ends of the struts 45, 46 are pivotally connected by suitable fasteners 54, 55 to the member 53 such that the pivotal axes thereof are spaced with respect to the pivotal connection of the struts 43, 44 with the member 53. The other ends of the struts 45, 46 are pivotally connected by suitable fasteners 56, 57 to the plate 35 adjacent to its right side. The pivotal axes of the struts of the respective arm sections 41, 52 are spaced from one another. In the preferred embodiment shown they are located at the corners of phantom parallelograms. As an alternative arrangement they may be located at the corners of a trapezium. Movement of the frame 25 on the base 24 is limited by an adjustable clamp and/or guide disk 60 which rests on the lower plate 37 which has a relatively large aperture 62 therein but of slightly smaller diameter than the disk 60. The plate 37 and in turn the frame 25 may be clamped to the base 24 by a hand nut 63, reached through an opening 64 in the table 18, threaded on the lower end of a bolt 65 which passes upwardly through the base 24 and has a head 66 in engagement against the upper side of the plate 37. By tightening or loosening the nut 63, the freedom with which the frame 25 is slidable on the top surface of the plate 37 may be varied and when firmly tightened, the nut 63 is capable of locking or securing the frame 25 against movement relative to the base 24.

The vise 30 which is secured to the upper surface of the plate 35 and is movable with the frame 25 has a base 68, a fixed jaw 70 and, a movable jaw 72 slidably supported on the base 68. The movable jaw 72 is reciprocated towards and from the fixed jaw 70 by a traversing screw 75 threaded in a boss 76 on the base and having a hand wheel 78 on the end opposite to the end connected to the movable jaw by which the operator can adjust the spacing between the jaws 70, 72 for gripping a workpiece.

Figure 3:
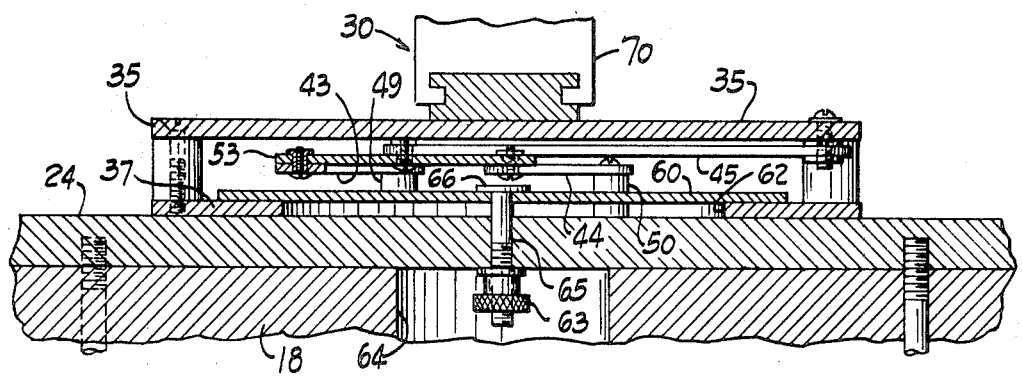
FIG. 3 is an offset cross-sectional view taken along line 3—3 of FIG. 2.
Figure 4:
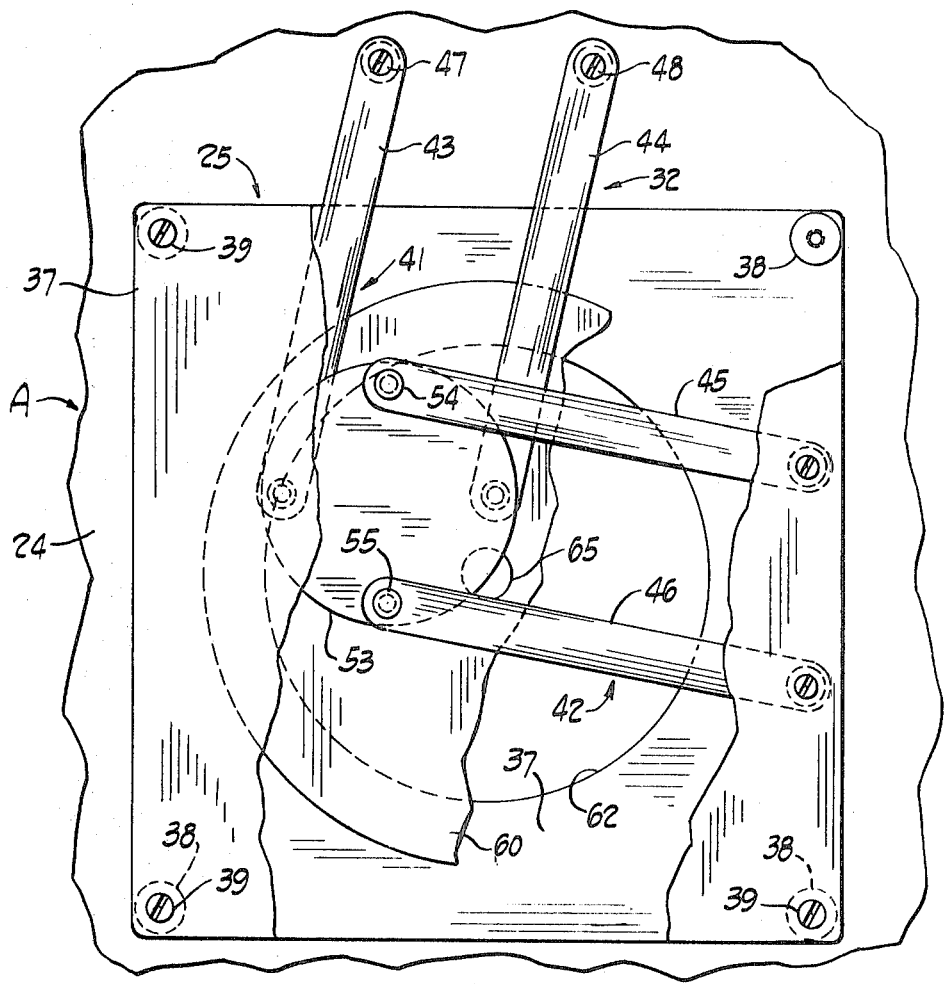
FIG. 4 is a plan view of the workholder with portions broken away to show the parallel motion arm and the various parts thereof.

The limit of movement of the frame 25 is determined by the size of the aperture 62 in the plate 37. As will be noted in FIG. 3, bolt 65 acts as a stop in any direction one choses to move the frame 25 by abutting the side of aperture 62. Provision is preferably made for fixedly securing the plate 24 of the workholder, shown, to the work table 18 of the machine. As shown, the plate 24 is detachably connected to the table 18 by screws 80 extending upwardly through the worktable and threaded in suitably tapped holes in the underside of the plate 24.

Figure 5:
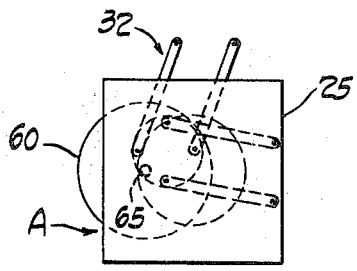
FIGS. 5, 6 and 7 depict three successive positions of the workholder in which the parallel motion arm is extended to the right, downwardly and to the left, respectively.
Figure 6:
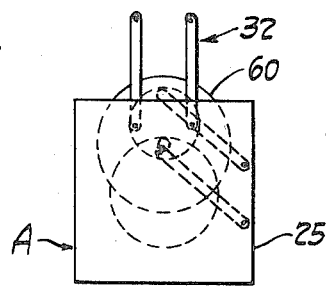
Figure 7:
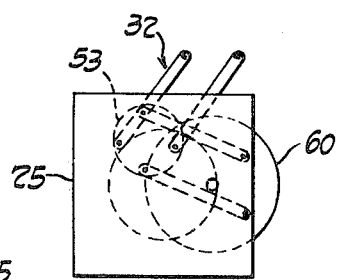

The operation of the preferred embodiment is more clearly visualized by referring to FIGS. 5, 6 and 7 which show respectively, in FIG. 5, the limit of movement of the workholder to the extreme right, in FIG. 6, to the extreme lower position, and to the extreme left position in FIG. 7, each as viewed from the top and showing only the relative positions of certain parts (25, 41, 42, 53, 60) of the workholder. While the vise 30 has been omitted so as to more readily visualize the positional relationship of the parts of the workholder, it will be kept in mind that the vise is fixed on the upper plate 35 of the frame 25 and thus will have the same relative position as the frame 25 regardless of the angular relationship of the sections 41, 42 of the articulated arm 32.

In the preferred embodiment shown, planes through the pivot axes of the respective arm sections with the member 53 are perpendicular to one another and these planes are parallel with planes through the pivotal connections at the other ends of the sections, respectively and the frame 25 moves in parallelism over the surface of the plate 24 with the vise 30 always being in the same angular position relative to the base 24. Visualizing a workpiece held by the vise 30 in which a diamond pattern of holes is to be drilled, it is readily apparent that once the workpiece is gripped by the jaws 70, 72, it is held firmly against turning relative to the base 24 by the articulated arm 32 and the only concern of the operator is with the alignment of the tool 17 with the marks on the work where the holes are to be drilled. This is accomplished simply by moving the frame 25 from whatever position it happens to be in at the moment in a manner to establish alignment between the tool 17 and the places where the holes are to be drilled. When final alignment is accomplished, it is merely necessary for the operator to lower the tool spindle. The arm 32 prevents rotation of the work during the drilling operation. The nut 63 can be tightened, if desired, to lock the frame 25 against any further movement on the plate 24.

Once a hole is drilled and the spindle 14 retracted, the nut 63, if tight, may be loosened, and the frame moved to reposition the workpiece for the next drilling operation. This is accomplished without releasing the grip that the vise 30 has on the workpiece. It will be appreciated that with the invention successive machining operations may be performed much more rapidly than where it is necessary to release and reclamp the workpiece between operations. Since the operator need not concern himself with reclamping the workpiece, the problem of alignment of the tool and work is simplified.

In the preferred embodiment the arm 32 is substantially housed within the frame 25. Even when it extends out over the base 24 to the limit of movement, it is still substantially protected by the frame. Thus, in the preferred embodiment the arm 32 is protected from damage by tools or other heavy objects which may be accidentally dropped from above. This is also true with respect to metal turnings from the machining operation which are deposited on the plate 35 rather than being allowed to fall upon the arm 32 where they might foul or make difficult the free movement of the arm.

The disk 60 serves a dual function. It overlays the bottom plate 37 of the frame 25 in a fashion to prevent the frame from being lifted from the base 24 during movement of the workholder and also as a clamp to lock the frame 25 in a desired position on the base 25.

What I claim is:

1. In a workholder, a base member having a planar surface, a frame member having upper and lower spaced plates rigidly secured together and adapted to be moved over said planar surface of said base member, said upper plate having work clamping means thereon for gripping a workpiece, and an articulated arm having first and second arm sections and operatively connecting said frame member to said base member permitting movement of said frame member over said planar surface but restricting angular movement of said frame member relative to said base member, said first arm section of said articulated arm comprising spaced rigid struts having their one ends pivotally connected to said base member and their other ends extending between said plates and pivotally connected to an intermediate arm member, said second arm section of said articulated arm comprising spaced rigid struts located between said plates and having their one ends connected to said intermediate member at points spaced from the pivotal connection of said struts of said first arm section therewith and their other ends pivotally connected to one of said spaced plates.

2. In a workholder, a base member having a planar surface, a frame member having upper and lower spaced plates rigidly secured together and adapted to be moved over said planar surface of said base member, said upper plate having work-clamping means thereon for gripping a workpiece and said lower plate having a relatively large aperture therethrough, an articulated arm operatively connecting said frame member to said base member permitting movement of said frame member over said planar surface but restricting angular movement of said frame member relative to said base member, said articulated arm having first and second arm sections, said first arm section comprising spaced rigid struts having their one ends pivotally connected to said base member and their other ends pivotally connected to an intermediate arm member, said second arm section comprising spaced rigid struts having their one ends pivotally connected to said intermediate member at points spaced from the connection of said struts of said first arm section therewith and their other ends pivotally connected to one of said spaced plates, a clamp plate at the upper side of said lower plate and overlying portions of said lower plate adjacent the periphery of said aperture through said lower plate, and means operatively connecting said clamp plate to said base member for moving said clamp plate toward and from said base member to clamp and release said frame member to and from said base member.

3. In a workholder, a base member having a planar surface, a frame member having upper and lower spaced plates rigidly secured together and adapted to be moved over said planar surface of said base member, work-clamping means on said upper plate of said frame member for gripping a workpiece, an articulated arm operatively connecting said frame member to said base member permitting movement of said frame member over said planar surface but restricting angular movement of said frame member relative to said base member, said articulated arm having first and second arm sections, said first arm section comprising spaced rigid strut members having their one ends pivotally connected to said base member and their other ends extending between said spaced plates and pivotally connected to an intermediate arm member, said second arm section comprising spaced rigid strut members located between said spaced plates and having their one ends pivotally connected to said intermediate member at points spaced from the connection of said strut members of said first arm section therewith and their other ends pivotally connected to the upper of said spaced plates, said lower plate of said spaced plates having a relatively large opening therethrough, a clamp plate at the upper side of said lower plate and overlying portions of said lower plate adjacent the periphery of said opening through said lower plate, and means operatively connecting said clamp plate to said base member for moving said clamp plate toward and from said base member to clamp and release said frame member to and from said base member.